United States Patent [19]

Krawczyk

[11] Patent Number: 5,632,592
[45] Date of Patent: *May 27, 1997

[54] EXTENSOR WING LATCH MECHANISM FOR A TWO-WHEELED HAND TRUCK

[75] Inventor: Joseph D. Krawczyk, Pinconning, Mich.

[73] Assignee: Magline, Inc., Pinconning, Mich.

[*] Notice: The term of this patent shall not extend beyond the expiration date of Pat. No. 5,518,356.

[21] Appl. No.: 609,532

[22] Filed: Mar. 1, 1996

Related U.S. Application Data

[63] Continuation of Ser. No. 393,177, Feb. 23, 1995, Pat. No. 5,518,356.
[51] Int. Cl.$^6$ ........................................ B62B 1/04
[52] U.S. Cl. .................. 414/445; 414/490; 414/786; 280/47.27
[58] Field of Search ........................ 414/444–447, 414/450, 453–456, 490, 786; 280/47.131, 47.17, 47.18, 47.19, 47.24, 47.27

[56] References Cited

U.S. PATENT DOCUMENTS

| | | |
|---|---|---|
| 1,418,754 | 6/1922 | Vangiesen . |
| 1,631,333 | 6/1927 | Privat . |
| 1,971,952 | 8/1934 | Townsend ..................... 414/456 X |
| 2,123,669 | 7/1938 | Von der Ohe ..................... 414/445 |
| 2,292,234 | 8/1942 | Malo . |
| 2,533,352 | 12/1950 | Chapman et al. ..................... 414/445 |
| 2,786,692 | 3/1957 | Timpson ..................... 280/47.18 |
| 2,812,190 | 11/1957 | Clifton ..................... 280/47.18 |
| 3,507,413 | 4/1970 | Hobson ..................... 414/454 |
| 3,997,182 | 12/1976 | Mortenson ..................... 280/47.27 |
| 4,726,602 | 2/1988 | Sanders et al. ..................... 280/79.3 |

FOREIGN PATENT DOCUMENTS

| | | | |
|---|---|---|---|
| 2247650 | 3/1992 | United Kingdom ..................... | 280/47.19 |

*Primary Examiner*—James W. Keenan
*Attorney, Agent, or Firm*—Learman & McCulloch

[57] ABSTRACT

A latch assembly mounted on a two-wheeled hand truck having vertically extending wings mounted on the hand truck frame side rails to pivot about axes extending generally parallel to said side rails from an operative position in which they extend laterally as substantially extensions of said side rails to a folded inoperative inboard transport position in which they lie inboard of the laterally inboard sides of said rails. The latch assembly is mounted on the frame for movement in a lateral path from a first position in which the latch assembly blocks movement of the wings to a laterally displaced second position in which the wings are freed to travel.

12 Claims, 6 Drawing Sheets

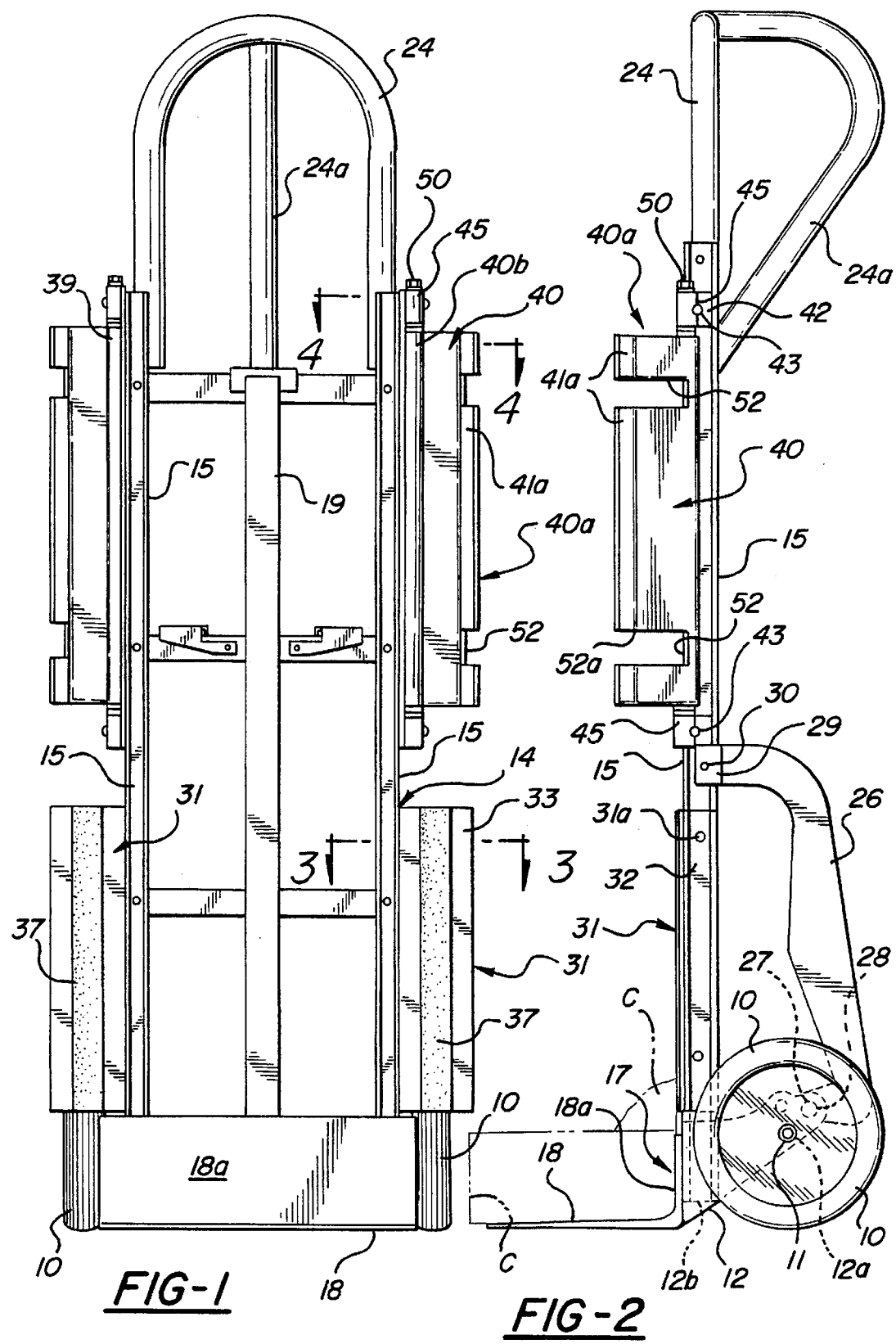

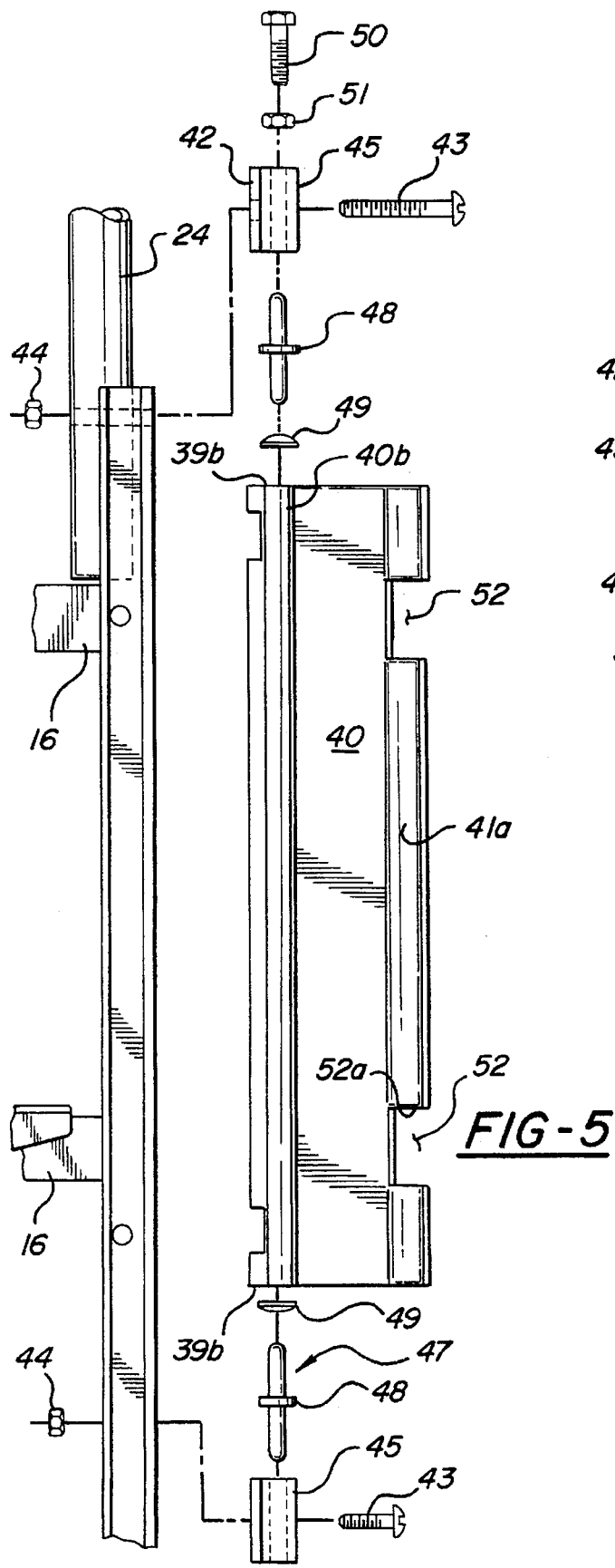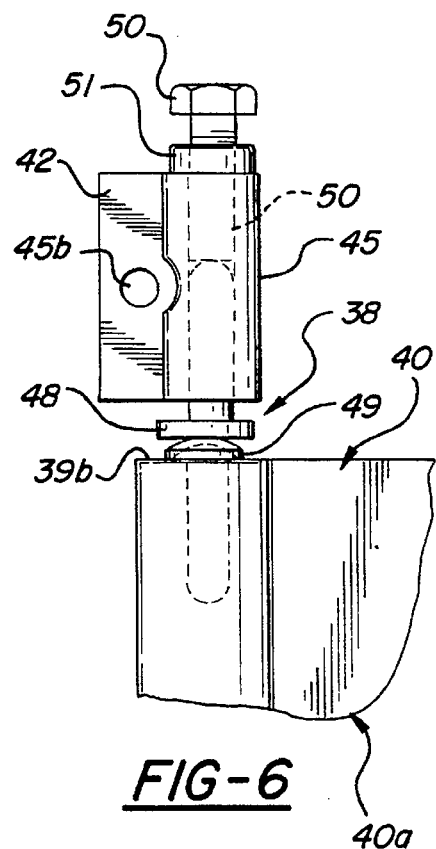

EXTENSOR WING LATCH MECHANISM FOR A TWO-WHEELED HAND TRUCK

This invention is a continuation of Ser. No. 393,177 filed Feb. 23, 1995, now U.S. Pat. No. 5,518,356.

This invention relates to improvements in two-wheeled hand trucks of the type used in a generally vertically inclined position to transport various loads of varying configuration on a generally horizontally disposed nose part connected to project forwardly from the primary frame.

BACKGROUND OF THE INVENTION

Recently, beverage cans have been packaged in cartons containing a dozen cans, but it has been determined that the standard hand truck depicted in typical hand trucks, such as shown in the present Assignee's U.S. Pat. No. 3,997,182, are not eminently suited to transporting these cartons in the stack configurations desired. Manufacturers of beverage containers are today desirous of transporting 12–16 cardboard cartons of twelvepack cartons at a time in multiple stacks, with a total load weight of more than two hundred pounds. Typically, such cartons are five inches tall and have side and end dimensions of 10-½ and 7-¾ inches, respectively, and when stacked in multiple stacks, the cartons extend beyond the sides of the hand truck's vertically disposed side rails. To provide an extended support surface for such stacks of cartons, hand trucks have been provided with vertical wing strips which pivot about vertical axes and include laterally outward end flanges for receiving and restricting movement of the cartons in the stacks. Such pivotal wings may be secured directly to the primary frame side rails in a manner to promote the transfer of load to the primary frame. When not in use, the wings are pivoted or folded inwardly to a laterally inboard position in which they lie generally parallel to the laterally inboard sides of the frame side rails.

It is common practice to carry such hand trucks on beverage transporting trucks in a position in which the nose plates are projecting rearwardly with the nose plates received in slots provided for them on the transporter truck. With the hand truck facing rearwardly from normal operating position, and the pivotal wings lying in folded inoperative position, the wind vortex created by the transport truck moving in a forward direction tends to force the wings to pivot away from folded position. This creates a rattling noise which is undesirable and, further, can result in damage to the wings.

SUMMARY OF THE INVENTION

The present invention is concerned with latch mechanism for holding the foldable wing strips optionally in their storage position laterally inboard and parallel to the hand truck side rails or in a position in which the wing strips are laterally inclined and together form a generally V-shaped cavity which will accommodate a load of cylindrical shape such as a barrel or keg.

One of the prime objects of the present invention is to provide latch mechanism for the wings which, when in operative position, retains the wings in inwardly folded, inoperative position during transport.

Another object of the invention is to provide latch mechanism which, in operative position, can also position the wings to function to accommodate cylindrical loads such as kegs, as well as the stacks of cartons previously mentioned.

Still another object of the invention is to provide latch mechanism which can be readily supported on a primary frame cross rail and swung to laterally inwardly displaced position to permit movement of the wings back and forth when desired.

Still another object of the invention is to provide latch mechanism which can be retrofitted to presently existing hand trucks for the purposes indicated.

Another object of the invention is to provide latch mechanisms of the character described which can be readily manufactured and do not add greatly to the cost of such hand trucks.

Still a further object of the invention is to provide a hand truck with readily operable latch mechanism of the type described which is durable and will safeguard the folding wings, enabling them to function versatilely to not only extend the lateral width of the hand truck but also provide keg carrying capability.

THE DRAWINGS

The presently preferred embodiment of the invention is disclosed in the following description and in the accompanying drawings, wherein:

FIG. 1 is a front elevational view of a hand truck which carries the latch mechanism, the hand truck wings being shown in an open, stacksupporting position, and the latch mechanism in rest position;

FIG. 2 is a side elevational view thereof;

FIG. 5 is an exploded fragmentary front elevational view, particularly illustrating a swingable wing;

FIG. 6 is a fragmentary front elevational view of the upper part of the swingable wing, prepared on an enlarged scale;

DETAILED DESCRIPTION

Figure 3:
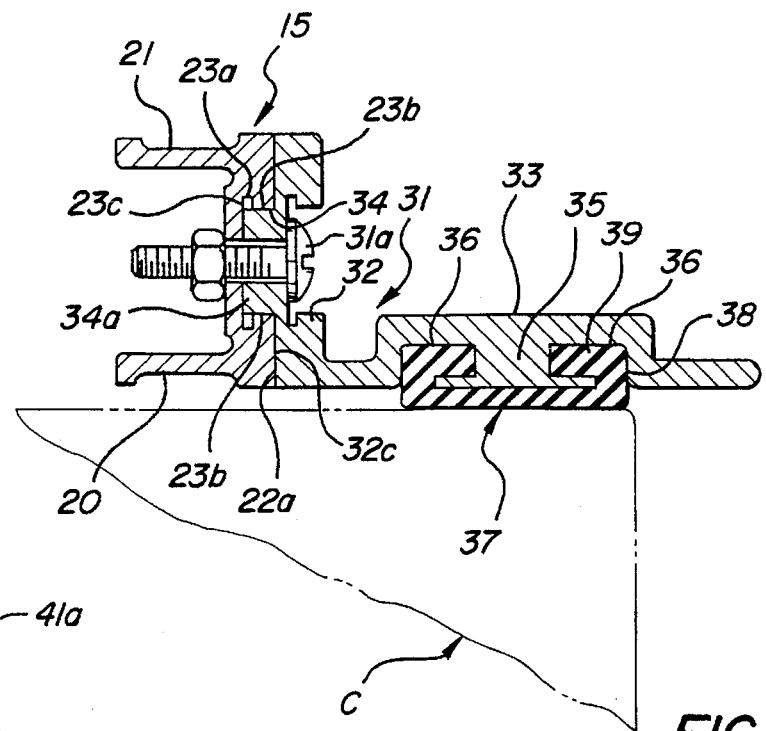
FIG. 3 is an enlarged, partly schematic, sectional plan view taken on the line 3—3 of FIG. 1.

Referring now more particularly to the accompanying drawings, and in the first instance to FIGS. 1 and 2 thereof, a hand truck of the construction shown in the aforementioned patent is depicted as comprising a pair of preferably rubbertired wheels 10, mounted on an axle 11. Axle mounted brackets 12 have the usual hubs 12a for receiving the ends of axle 11, with the hubs to be used dependent on the diameter of the wheels, and extend forwardly to mount to the lower ends of a primary frame, generally designated 14. The primary frame is constructed in the form of an open framework made up of side rails 15, connected rigidly by cross rails 16. Projecting forwardly from the primary frame 14, and rigidly secured to it, is a nose piece, generally designated 17, which includes a forwardly extending load carrying nose or plate 18 with a rear wall 18a which secures rigidly to the lower end of each of the side rails 15. A vertically extending, centrally disposed support bar 19 may rigidly secure to the cross rails 16 in any suitable manner. The brackets 12 may be rigidly bolted to the side rails 15 in the manner disclosed in the aforementioned patent.

Figure 4:
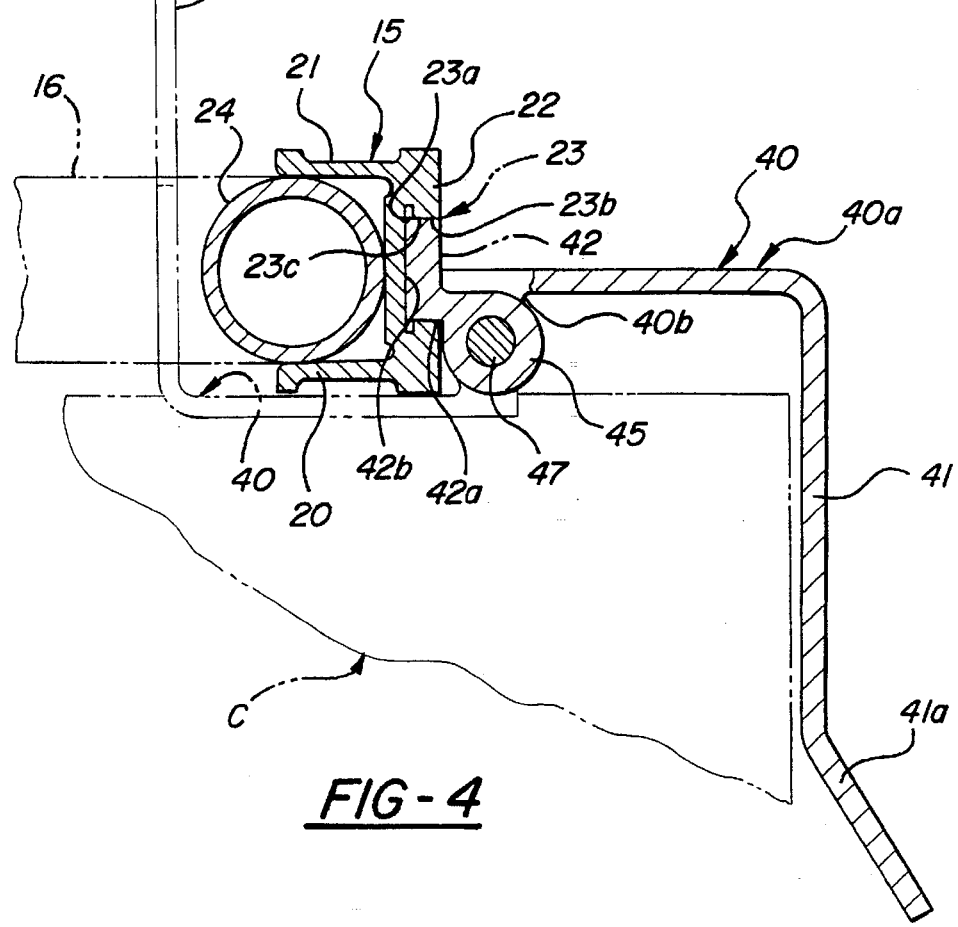
FIG. 4 is a similar view taken on the line 4—4 of FIG. 1, chain-lines fragmentarily illustrating a cross rail of the truck and a carton diagrammatically, and also a folded in, storage position of one of the pivotal wings.

Typically, hand trucks of this character are constructed very economically of a lightweight material, such as aluminum, and extrusions of the configuration particularly illustrated in FIGS. 3 and 4 are employed as the side rails 15. As these figure indicate, the extruded rails 15 are generally channel shaped in cross section and include front and rear channel legs 20 and 21, connected by a web 22. As in the aforementioned patent, the web 22 is extruded with a generally T-shaped groove or slot 23. The portion 23a of the vertically extending slot 23 can accommodate the advertising slogan or identification plastic strip described in the aforementioned patent and the portion 23b will snugly accommodate the vertical key 12b provided on the inboard sides of each of the brackets 12. The grooved outboard faces of the side rails 15 are used to rigidly secure the wing strips which will be described but form no part of the present invention. Side rail channel legs 21 are also utilized to receive the free lower ends of a typical bale-shaped handle member 24 which has a rearwardly projecting handle bar 24a. The handle ends are typically bolted in the position shown in FIG. 4.

Generally U-shaped stair climber members 26 (see FIG. 2) are preferably provided in the same manner as in the aforementioned patent to mount to the brackets 12 and to the side rails 15. At their lower ends, the stair climbers 26 have mounting openings 27, which can bolt to the brackets as at 28. At their upper ends, clip assemblies 29, which may be of the same construction as in the aforementioned patent, secure the stair climbers to rails 15, and bolt in place as at 30. Provided on the side rails 15, just below the clips 29 which secure the upper ends of the stair climbers 26 in position, are fixed extensor strips, generally designated 31, which, as FIG. 3 demonstrates, secure to the side rails 15 with bolt and nut assemblies 31a.

The extensor strips 31 are shown as of right angular configuration in cross section and include a base part 32 and an extensor part 33. Each element 32 has an inwardly extending projection or key 34 which is snugly received between the side rail groove surfaces 23b and includes a flat surface 34a which mates with the web wall surface 23c. The base part 32, in addition, has flat surfaces 32c, which bear against the web surfaces 22a, so that the strips 31 can extend flushly from the sides of rails 15. Provided integrally on each of the strip elements 33 is a vertically extending T-bar 35 which provides angle shaped slots 36 for receiving friction creating, resilient pads, generally designated 37. The pads 37 have angular attachment sections which comprise legs 38 and inturned ends 39. Pads 37 may be constructed of closed cell foam in the form of sleeves, which can be slipped vertically over the T-bars 35. The pads 37 (see FIG. 3) project slightly from the front wall surfaces of the strip elements 33 and function as a part thereof to engage the cartons C.

Mounted above the upper ends of the stair climbers 26, are wing strips or wing strip assemblies, generally designated 40a, which are particularly disclosed in FIGS. 4–6. Each wing or wing strip 40a includes a base portion or hinge part 40b and an integral wing strip element 40 having a forwardly directed flange 41 with an out-turned piloting terminal edge or portion 41a. As will become apparent, the wing elements 40 are pivotal, whereas the strip elements 33 are fixed.

Fixed to the side rails 15, as with bolts 43 and nuts 44 (FIGS. 5 and 6) are upper and lower sleeves 45, which have side rail-received keys or flanges 42 with openings 45b for passing the bolts 43. Each key or key part 42 has lateral walls 42a, which snugly engage between the groove walls 23b and a flat wall surface 42b mating with the flat wall surface 23c. Thus, the sleeves 45 are held rigidly in position. The sleeves 45 receive the ends of hinge pins, generally designated 47, which are each provided with an intermediate fixed flange 48. The opposite ends of the hinge pins 47 are received within the wing hinge parts 40a and it will be noted that Belleville washer springs 49 are provided between the flanges 48 and the end surfaces 39b of the hinge part 40a. Provided within the upper sleeve 45, which receives the outer end of upper pin 47 is a bolt 50, which threads through a nut 51 fixed to the upper sleeve 45, to engage the end of pin 47. When bolt 50 is threaded inwardly to bear axially on the pin 47, the result is to compress the springs 49 which then resist any tendency of the wing strip elements 40 to freely pivot. It is only when this frictional compression is manually overcome that the wing strip elements 40 can be swung 180 degrees from the position shown in solid lines in FIG. 4 to the phantom line hand truck transport or storage position in which they fold into the hand truck and the portions 41 thereof project rearwardly, rather than forwardly. To permit this to occur, slots 52 are provided in the wing strip elements 40 to pass the crossrails 16.

Figure 9:
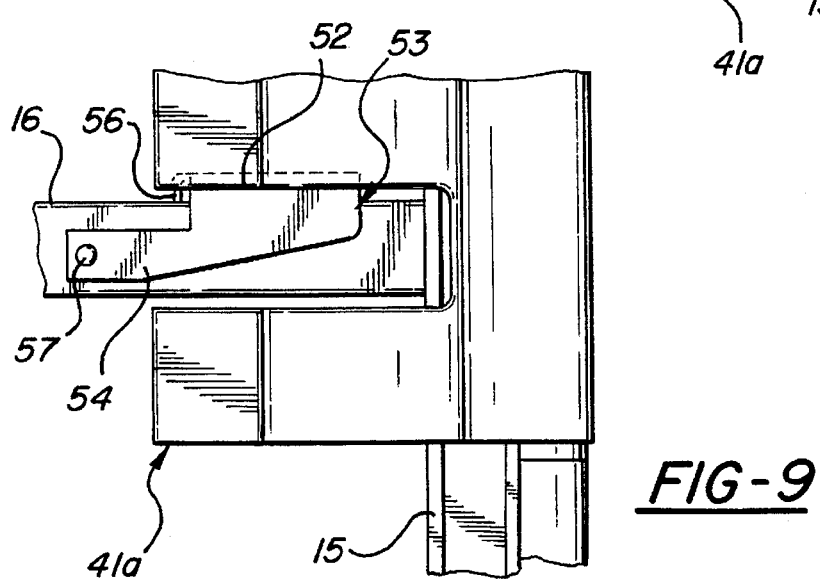
FIG. 9 is a fragmentary rear elevational view in which the wing is shown pivoted outwardly beyond the cross rail to a position in which it can accommodate a keg, and the latch mechanism is shown restored to a rest position in which it prevents the wing from pivoting further inwardly.

Provided on the vertically intermediate cross rail 16, as shown in FIG. 1 is an overall latch assembly or mechanism, generally designated L. As shown in FIG. 1, the latch assembly L comprises a pair of latch arms or latch arm mechanisms 53 mounted on the cross rail 16, one on each side of the vertical support bar 19. Since the latch arms 53 are identical, except that they face in opposite directions, a description of one of them will suffice, and attention is directed particularly to FIGS. 7 and 11. As FIG. 11 shows, each latch or latch arm 53 includes a pair of arm elements 54 integrally connected at their upper ends by a web 55 which has a downturned flange 56 functioning as a cross rail engaging keeper or stop. The arm elements 54 are pivotally mounted, as with a cross pin 57, which extends through the cross rail 16 and permits easy pivoting of the latch arms 53 from the wing-blocking position illustrated by the chain lines in FIG. 11 to a position in which the latch arm 53 swings upwardly toward the vertically extending support bar 19 and swings laterally out of wing-blocking position. When the latch assemblies 53 are in the down or rest position illustrated by chain lines in FIG. 11, and the wings 40 are in the folded position illustrated by the phantom lines in FIG. 11, the arm elements 54 of each latch device 53 project above the upper marginal edges 52a of the slots 52 in the wings 40 and prevent the folded wings 40 substantially from moving. When the latch mechanisms 53 are lifted to clear the wings 40, the wings can be swung outwardly to the position shown in FIG. 10 in which the latch mechanisms 53 prevent the wings 40 from moving rearwardly. In this position, the wings 40, conjunctively with the latch mechanisms 53, readily support a beverage keg K on nose plate 18 and resting against frame 14. FIG. 9 illustrates this relative position of the latch arms 53 and wings 40 and shows the latch mechanism in blocking position relative to the slots 52.

It should be understood that the lower strips 31 may be replaced with extended wing strips 38 so that the lower cartons in the stack will also be retained within the flanges 41 of the wing strips 38.

THE OPERATION

Figure 7:
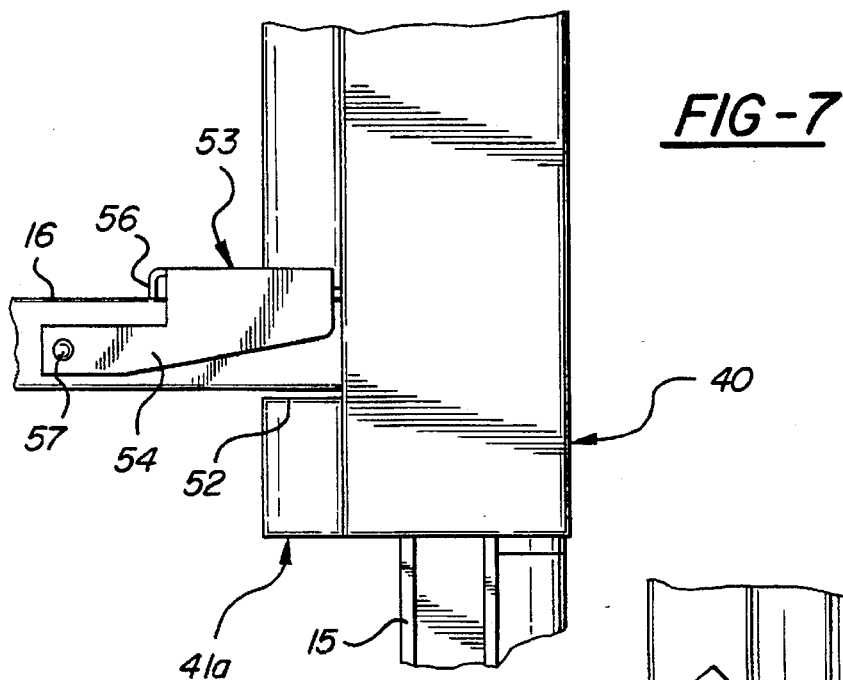
FIG. 7 is an enlarged, fragmentary, front elevational view showing a latch arm disposed in operative position retaining the position of a pivotal wing which has been swung into inoperative folded position.

In order to pivot the wing strip elements 40 to the inboard folded position shown in FIG. 7, it is only necessary to lift the latch arm mechanisms or devices 53 to a position near vertical in which the front surfaces 55a are removed from the swinging path of the strips 40 and exert sufficient force to push the wing strips 40 forwardly to overcome the frictional resistance imposed by the springs 59. When the latch arms 53 are allowed to drop then, under the influence of gravity, into the FIG. 7 position, the wing strips 40 are prevented from moving out of folded storage position.

Figure 8:
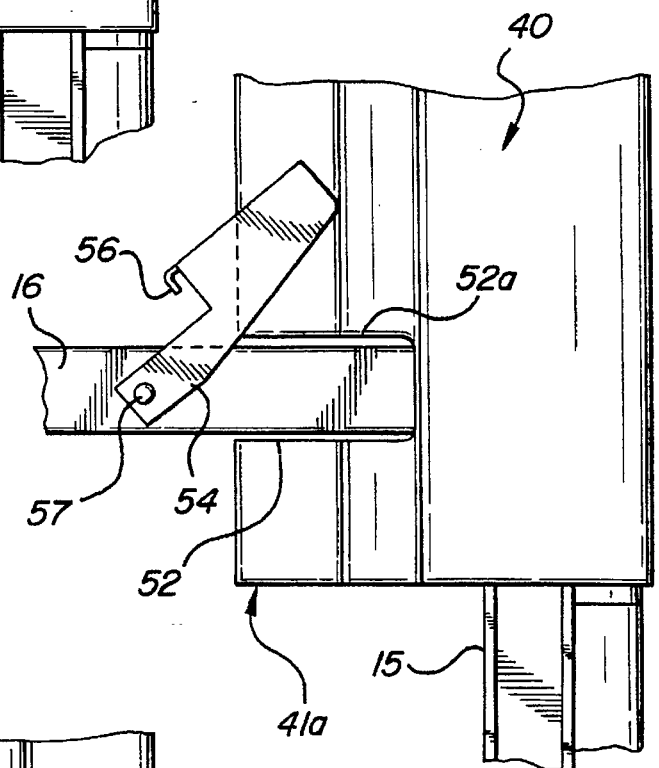
FIG. 8 is a view similar to FIG. 7, with the latch arm shown in the process of being raised to a position in which the pivotal wing can be returned outwardly.
Figure 10:
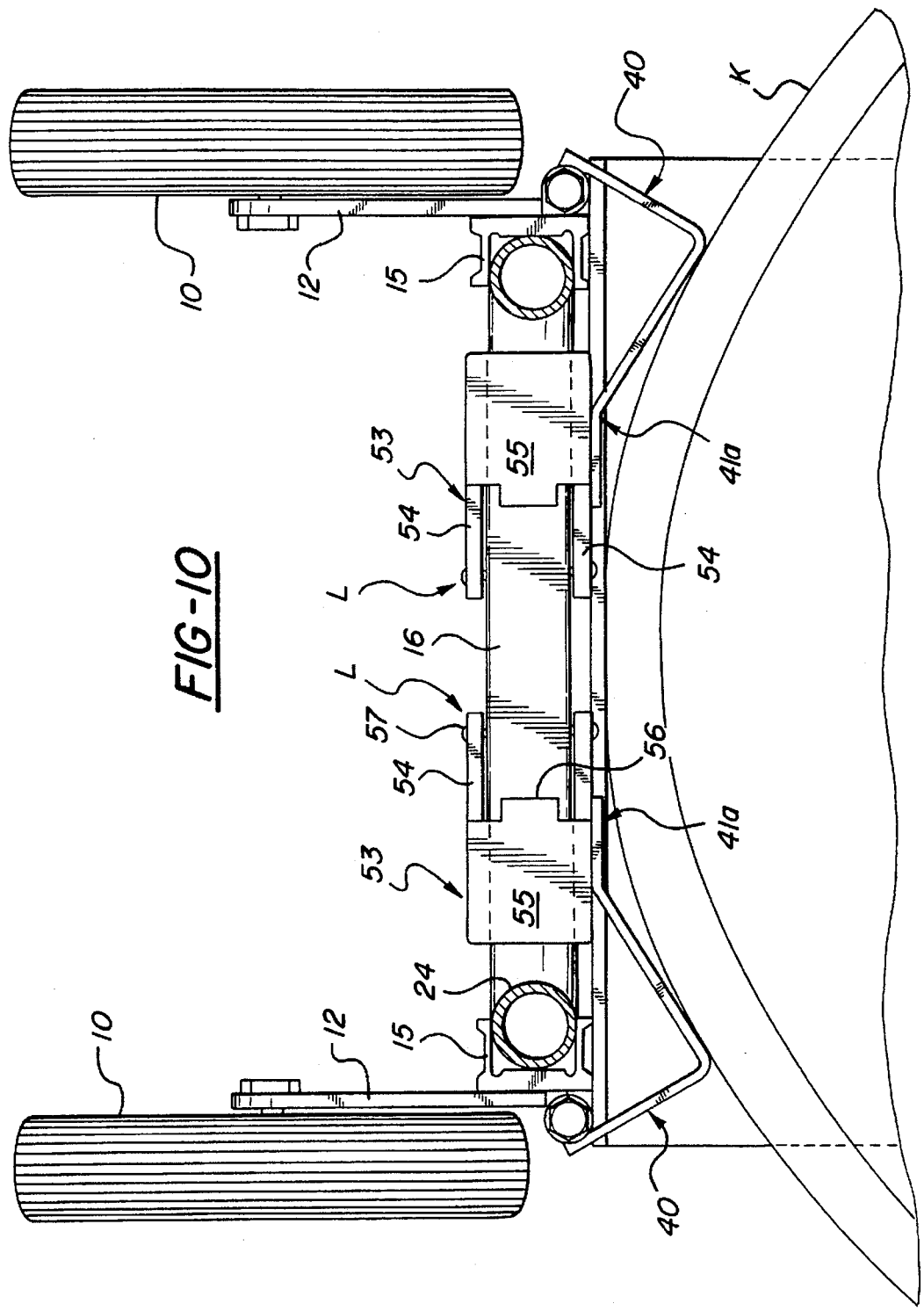
FIG. 10 is a fragmentary top plan view on an enlarged scale showing the pivotal wings disposed in an inwardly swung position in which they, conjunctively with the latch mechanism, function to accommodate a keg.
Figure 11:
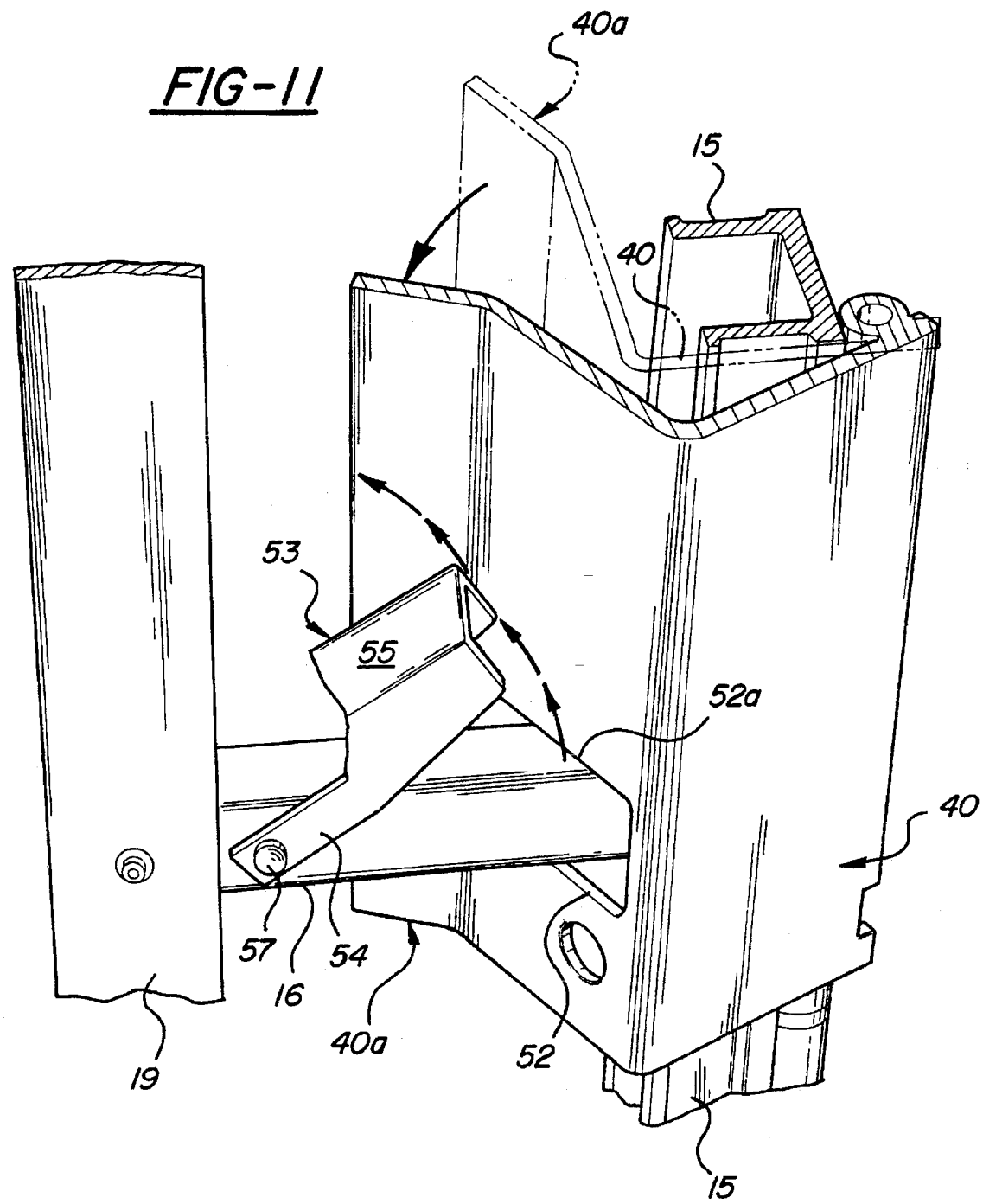
FIG. 11 is a perspective elevational view on an enlarged scale illustrating the manner in which a latch arm is swung upwardly to permit the foldable wing to be swung outwardly past the cross rail.

To achieve the versatility of utilizing the extensor wings 40 and latch devices 53 to enable the transport of cylindrical kegs K, as illustrated in FIG. 10, it is merely necessary to lift the latch devices 53 again as shown in FIG. 8, and swing the wing strips 40 forwardly to a position beyond the cross bar 16 before dropping the latch devices 53 into operative slot-blocking position once again. When the hand truck is to be used to once again transport stacks of cartons, the wing strips 40 are swung from the FIG. 10 position to the FIG. 4 position.

It is to be understood that the embodiments described are exemplary of various forms as the invention only and that the invention is defined in the appended claims, which contemplate various modifications within the spirit and scope of the invention.

I claim:

1. In a two-wheeled hand truck comprising a pair of laterally spaced axled wheels; a frame with front and rear sides supported by said wheels and adapted for transport in a position of vertical inclination, and having upper and lower ends, said frame including laterally spaced apart side rails with front, rear, and laterally inboard and outboard sides, connected by at least one laterally extending cross rail, and having a surface at its upper end which can be grasped to move the hand truck manually along a supporting surface; a forwardly extending nose projecting from the front side of said lower end of said frame; and at least one vertically extending wing mounted on said frame to pivot from a first operative position in which it extends laterally as generally a continuation of said front side of one of the side rails to a folded storage position in which it lies laterally inboard of the laterally inboard side of one of said side rails; the improvement wherein;

a latch assembly is mounted on said frame for movement from a first position in which a portion of said latch assembly lies rearwardly of the path of movement of said at least one wing, to prevent movement of said at least one wing from a second operative position thereof in which said at least one wing bears on said latch assembly and has a portion which extends at a laterally, forwardly inclined angle, to a displaced position in which said at least one wing is freed to travel to said folded storage position and back to said first position of said latch mechanism to retain said at least one wing in said folded storage position.

2. The structure of claim 1 in which said latch assembly comprises a latch arm mounted on said frame to move generally in a laterally extending vertical plane.

3. The structure of claim 2 in which said at least one wing has a slot and said latch arm is pivotally mounted on said at least one cross rail for movement from a position blocking said slot to permit said wing to pass by said at least one cross rail to a laterally inwardly disposed non-blocking position.

4. The structure of claim 3 in which said latch arm comprises a laterally extending side part lying respectively on opposite sides of said side rail and a bridging keeper part spanning upper portions of said side parts of said latch arm to rest on said one of said side rails in a position to block said wing slot.

5. The structure of claim 4 in which front to rear extending pins mounted by said one of said cross rails near each side rail pivotally mount said latch arm.

6. In a method of retaining folding extensor wings of a two wheeled hand truck comprising a pair of laterally spaced axled wheels; a frame, with front and rear sides, supported by said wheels and adapted for transport in a position of vertical inclination and having upper and lower ends, said frame including laterally spaced apart side rails with front, rear, and laterally inboard and outboard sides, connected by at least one laterally extending cross rail, and having a surface at its upper end which can be grasped to move the hand truck manually along a supporting surface; a forwardly extending nose projecting from the front side of said lower end of said frame; and a pair of laterally spaced vertically extending wings mounted on said frame to pivot about axes extending generally parallel to said side rails from a first operative position in which they extend laterally as substantially a continuation of said front sides of the side rails to a folded storage position in which they lie laterally inboard of the laterally inboard sides of said side rails; the wings having slots aligned vertically with said at least one cross rail so as to freely pass by said at least one cross rail when pivoting from said first operative position to said folded storage position; the step of:

(a) mounting a latch assembly on said frame to be movable from a retention position blocking travel of said wings from said folded storage position to a wing releasing position in which said wings can swing forwardly to said first operative position.

7. The method of claim 6 including moving said latch assembly to said wing releasing position and said wings from said folded storage position to said first operative position.

8. The method of claim 7 including moving said latch assembly back to said retention position and moving said wings back to a position engaging said latch assembly in which they are forward of said cross rail and extend at laterally and forwardly inclined angles to form a generally V-shaped cavity; and loading a generally cylindrical load to said noseplate and into said cavity.

9. The method of claim 6 including mounting said latch assembly by pivotally securing a pair of latch arms on said cross rail which in said retention position block said slots but are swingable to said wing releasing position out of the path of travel of said wings.

10. An extensor wing latch mechanism in combination with a two-wheeled hand truck having a pair of laterally spaced wheels; an axle mounting said wheels on the ends thereof; a frame with front and rear sides adapted for transport in a position of vertical inclination and having upper and lower ends, said frame including laterally spaced apart side rails, with front, rear, and laterally inboard and outboard sides, connected by cross rails, and having a surface at its upper end which can be grasped to move the hand truck manually along a supporting surface; brackets connecting said axle to the lower end of said frame and supporting said frame for travel on said wheels; a forwardly extending nose projecting from the front side of said lower end of said frame; and vertically extending wings mounted on said frame to pivot about axes extending generally parallel to said side rails from an operative position in which they extend laterally outwardly generally in line with said side rails to a folded inoperative inboard position in which they lie inboard of the inboard sides of said rails, said wings having slots vertically aligned with one of said cross rails so as to freely pass by said one of said cross rails when moving to said folded position;

(a) said latch mechanism including a latch element mounted on said frame for movement from a first position in which said latch element lies forwardly of the path of movement of one of said wings to prevent movement of said wing from said folded position to a displaced second position in which said wing is freed to travel to said operative position.

11. The structure of claim 10 in which said latch element comprises a latch arm pivotally mounted on said frame to swing generally in a laterally extending vertical plane.

12. The structure of claim 11 in which said latch arm is pivotally mounted on said one of said cross rails for movement from a position in which it blocks front to rear movement of one of said wings through said slot to a laterally inwardly disposed nonblocking position.

* * * * *